(12) United States Patent
Wu

(10) Patent No.: US 11,836,983 B2
(45) Date of Patent: Dec. 5, 2023

(54) INDEPENDENT TOILET SEAT ASSEMBLY WITH IMAGE RECOGNIZERS FOR AUTOMATIC LIFTS

(71) Applicant: NEURONBASIC TECHNOLOGY INC., Santa Clara, CA (US)

(72) Inventor: Raymond Wu, Santa Clara, CA (US)

(73) Assignee: Neuronbasic Technology Inc., Santa Clara, CA (US)

( * ) Notice: Subject to any disclaimer, the term of this patent is extended or adjusted under 35 U.S.C. 154(b) by 0 days.

(21) Appl. No.: 17/739,829

(22) Filed: May 9, 2022

(65) Prior Publication Data

US 2023/0290148 A1 Sep. 14, 2023

Related U.S. Application Data

(63) Continuation-in-part of application No. 17/693,816, filed on Mar. 14, 2022.

(51) Int. Cl.
*G06V 20/50* (2022.01)
*G06V 40/16* (2022.01)
*A47K 13/10* (2006.01)

(52) U.S. Cl.
CPC ............. *G06V 20/50* (2022.01); *A47K 13/10* (2013.01); *G06V 40/161* (2022.01)

(58) Field of Classification Search
CPC ................................. A47K 13/10; E03D 9/00
USPC ........................................................ 4/246.1
See application file for complete search history.

(56) References Cited

U.S. PATENT DOCUMENTS

| | | | | |
|---|---|---|---|---|
| 8,640,268 B2* | 2/2014 | Shek | ...................... | A47K 13/10 4/246.1 |
| 10,791,888 B1* | 10/2020 | Doctor | ................... | A47K 13/10 |
| 2019/0369085 A1* | 12/2019 | Tan | .......................... | G01N 1/10 |
| 2021/0045594 A1* | 2/2021 | Isomura | ................. | A47K 13/24 |
| 2022/0028559 A1* | 1/2022 | Hall | ....................... | G16H 10/20 |
| 2022/0315980 A1* | 10/2022 | Kim | ....................... | A61B 10/00 |

* cited by examiner

*Primary Examiner* — Christine J Skubinna
(74) *Attorney, Agent, or Firm* — Rosenberg, Klein & Lee

(57) ABSTRACT

The present invention relates to an independent toilet seat assembly with image recognizers for automatic lifts, which Includes a seat assembly having a cushion ring and one upper lid extended therefrom and at least one image recognizer. The seat assembly can be combined on a toilet pot, and it has provided with one controller and two-powered units inside. The image recognizer can be located on the side of the seat assembly, which is electrical connected to the controller, or installed on the wall at the back of the toilet at an appropriate position, which is electrically connected to the controller by wireless means, such as a bluetooth, etc. The controller is connected to two power units, wherein the first power unit is used to control the automatic lifting and closing of the cover lid. The second power unit is used to control the automatic lifting and closing of the cushion ring. It does not require users to touch with hands, achieves the convenience of safety and hygiene, and meets the requirements of intelligent living.

4 Claims, 4 Drawing Sheets

INDEPENDENT TOILET SEAT ASSEMBLY WITH IMAGE RECOGNIZERS FOR AUTOMATIC LIFTS

This is a CIP application of U.S. Ser. No. 17/693,816 which is filed on 14 Mar. 2022. It can be used to combine various toilet pots, and use the image recognizer to judge to achieve lifts of a separate lid or together with a cushion ring to form a smart toilet to provide convenient home use.

BACKGROUND

Field of the Invention

When the toilet is not in use, the correct way is to close the toilet covers to avoid drifting the odor and open it when used. Most of the existing toilet structures must be opened with their hands when they are using it, which is not convenient, and there will be doubts of staining hands. In the case of being urinating, men need to manually lift the toilet lid and cushion ring. It will increase the possibility of dirty or contact with bacteria. It is known an improved automatic lift toilet structure. It uses infrared or radar waves. When a user approaches, it can automatically lift the toilet lid. This uses infrared induction or the design of radar waves as a difference in body temperature or light, and both will cause errors because of often changes in abnormal light changes or angle differences. It may also be due to the nature of users' clothing materials, such as reflex phenomena, which causes instability of induction.

In U.S. Ser. No. 17/693,816, the same inventor has invented an image recognition automatic flip-top smart toilet. However, the design of this structure is the overall combination of the toilet. For those who want to use, it must be replaced by the entire toilet. And its image recognition chip is directly located on the toilet. Hence the installation location is limited, which may affect the recognition effect.

SUMMARY

The present invention relates to an independent toilet seat assembly with image recognizers for automatic lifts, which Includes a seat assembly having a cushion ring and one upper lid extended therefrom and at least one image recognizer. The seat assembly can be combined on a toilet pot, and it has provided with one controller and two-powered units inside. The image recognizer can be located on the side of the seat assembly, which is electrical connected to the controller, or installed on the wall at the back of the toilet at an appropriate position, which is electrically connected to the controller by wireless means, such as a bluetooth, etc. The controller is connected to two power units, wherein the first power unit is used to control the automatic lifting and closing of the cover lid. The second power unit is used to control the automatic lifting and closing of the cushion ring. When the image recognizer detects that the user in front of the toilet is a non-frontal image, it will send a signal to the controller, so that the controller activates the first power unit to lift the upper lid, allowing the user to sit on the cushion ring for use. When the image recognizer detects that the user in front of the toilet is a frontal image, it will send another signal to the controller, so that the controller activates the two power units at the same time to lift the cover lid and the cushion ring together, providing male standing use. It does not require users to touch with hands, achieves the convenience of safety and hygiene, and meets the requirements of intelligent living.

DETAILED DESCRIPTION AND PREFERRED EMBODIMENT

Figure 1:
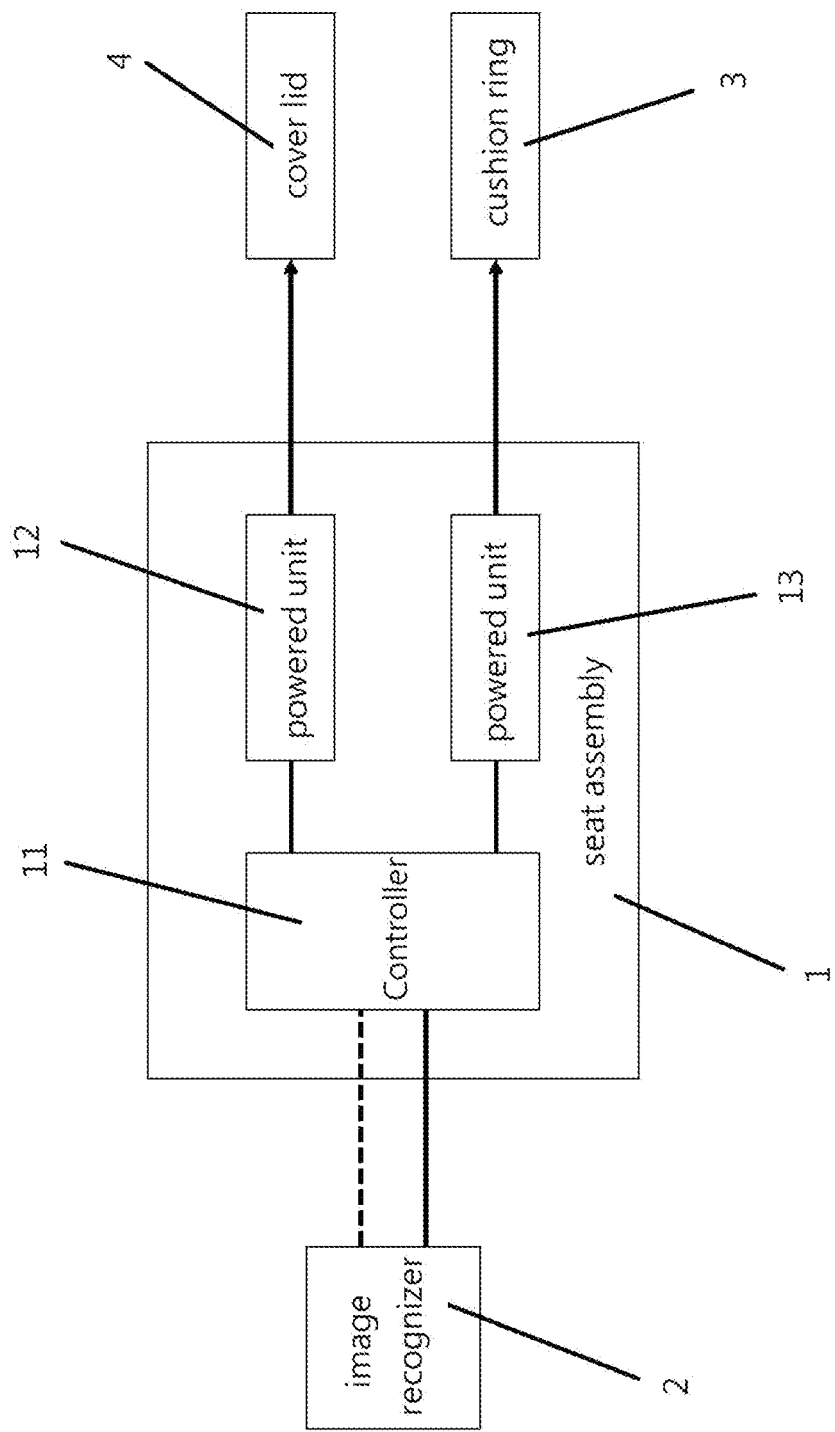
FIG. 1 is a block structure schematic diagram of the present invention.
Figure 2:
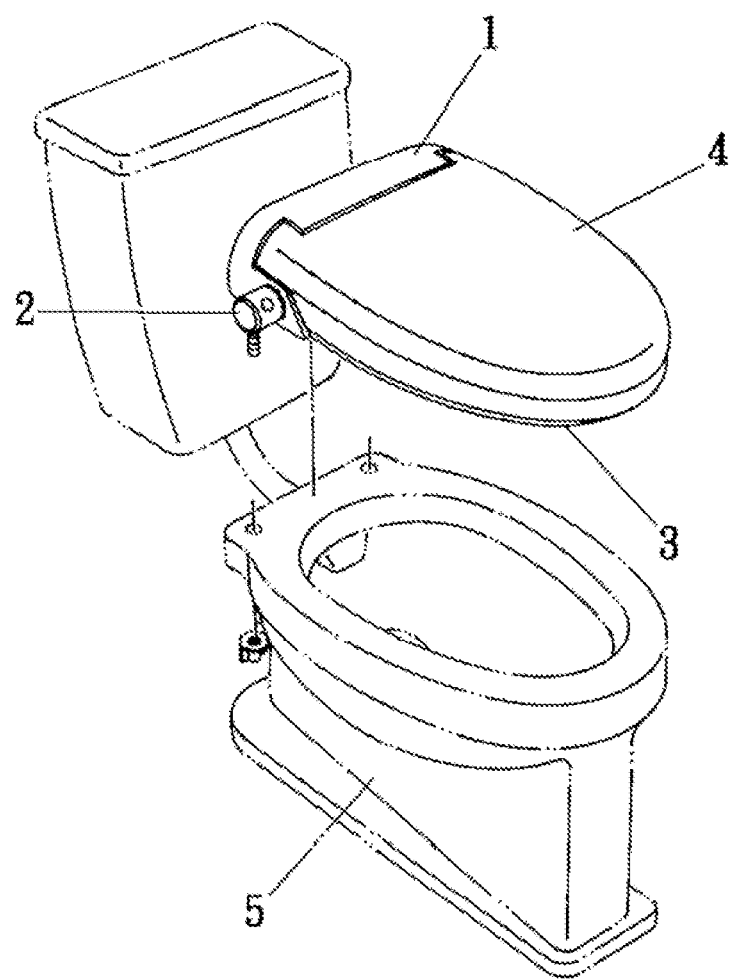
FIG. 2 is an assembled perspective view of the present invention.
Figure 3:
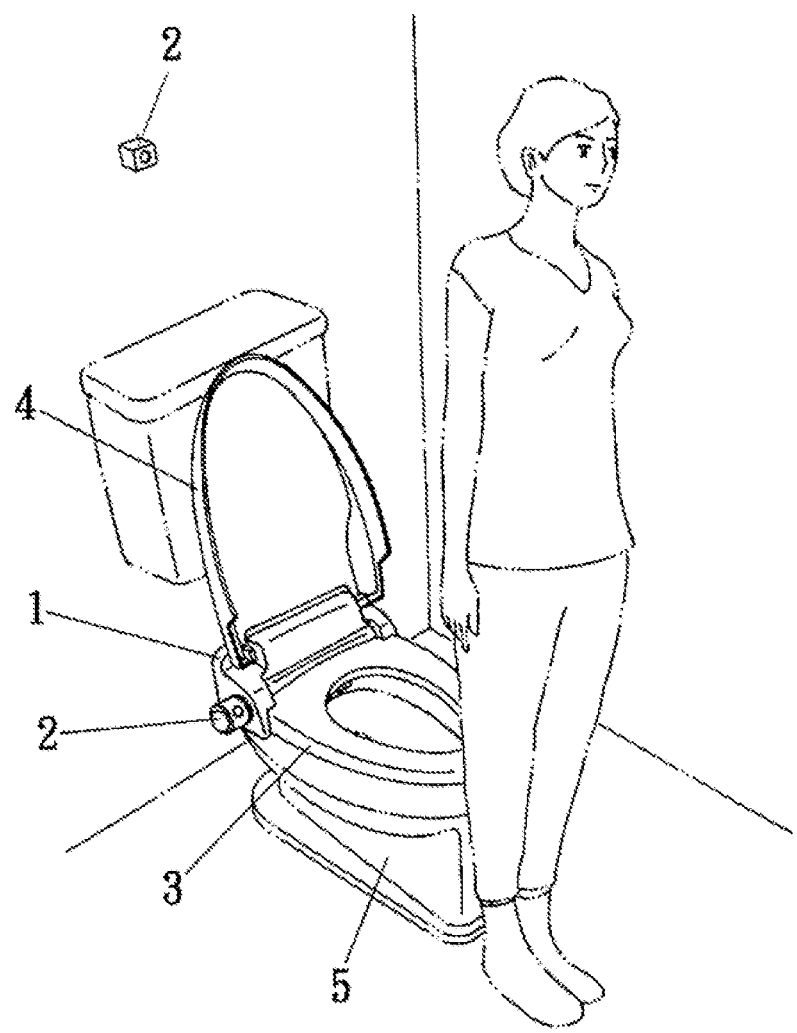
FIGS. 3 and 4 are perspective views of the use state of this invention.
Figure 4:
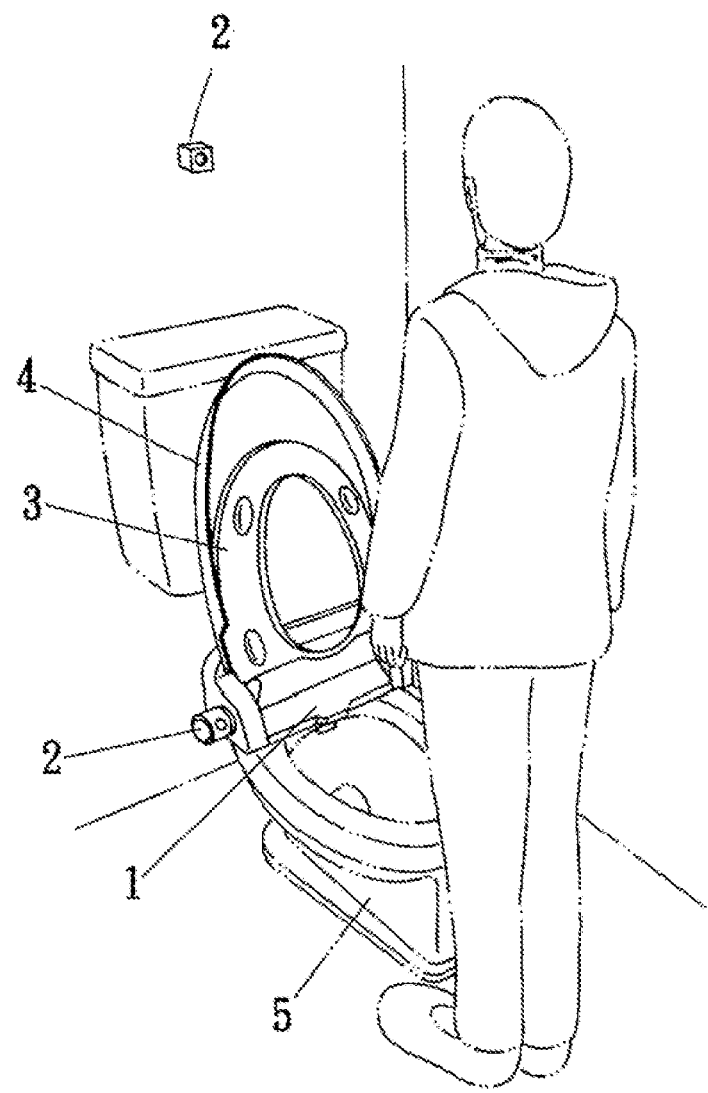

Please refer to FIGS. 1 and 2, the present invention relates to an independent toilet seat assembly with image recognizers for automatic lifts, which Includes a seat assembly 1 having a cushion ring 3 and one cover lid 4 extended therefrom and at least one image recognizer 2. The seat assembly 1 can be combined on a toilet pot 5, and it has provided with one controller 11 and two-powered units 12, 13 inside. The image recognizer 2 can be located on the side of the seat assembly 1, which is electrical connected to the controller 11, or installed on the wall at the back of the toilet at an appropriate position, which is electrically connected to the controller by wireless means, such as a bluetooth, etc. The controller 11 is connected to two power units 12, 13, wherein the first power unit 12 is used to control the automatic lifting and closing of the cover lid 4. The second power unit 13 is used to control the automatic lifting and closing of the cushion ring 3.

When the image recognizer 2 detects that the user in front of the toilet is a non-frontal image, it will send a signal to the controller 11, so that the controller 11 activates the first power unit 12 to lift the cover lid 4 only, allowing the user to sit on the cushion ring 3 for use. When the image recognizer 2 detects that the user in front of the toilet is a frontal image, it will send another signal to the controller 11, so that the controller 11 activates the two power units 12, 13 at the same time to lift the cover lid 4 and the cushion ring 3 together, providing male standing use. Therefore, no matter how the user wants to use it, he does not need to operate the toilet cover lid 4 or the cushion ring 3 by hand, which is not only very convenient, but also avoids the bad result of contact with dirt or bacteria. When it is detected that the user leaves, it will send out a signal to make the cover lid 4 and the cushion ring 3 close and return to the original state, which is highly practical and progressive.

The image recognizer 2 mainly uses face recognition technology, which adopts edge computing mode, determines whether the captured image contains a human face, and transmits the corresponding signal to the controller to link different power units to perform specific actions. There is no need to connect to the cloud network, which is quite power saving. It can achieve a very accurate identification effect to control the corresponding automatic flip of the toilet and obtain intelligent effects. In addition, because this invention uses face recognition, there is no need to compare the memory storage database, and no images will be stored during use, which can avoid privacy issues.

Furthermore, the independent toilet seat assembly of the present invention can be applied to various toilets, and users do not need to replace the entire toilet bowl, which improves practicality and economy. The image recognizer is set to be detachable, and the wireless transmission connection method can improve the recognition effect. Hence, this invention obviously has progressive practical effects and meets the requirements for allowance a patent.

I claim:

1. An automatic toilet seat, comprising:

a seat assembly having a housing coupled to a toilet and including a cushion ring and a cover lid coupled to the housing and configured to extend over a bowl portion of the toilet, the seat assembly further including a controller disposed within the housing, a first power unit and a second power unit disposed within the housing and respectively electrically coupled to the controller, the first power unit being drivingly coupled to the cover lid for lifting and closing the cover lid with respect to the bowl portion of the toilet, and the second power unit being drivingly coupled to the cushion ring for lifting and closing the cushion ring with respect to the bowl portion of the toilet, the seat assembly further including an image recognizer disposed external to the housing and communicatively coupled to the controller, wherein the image recognizer is configured to detect a presence of an image of a human form in proximity to the toilet and transmit a first signal to the controller, the image recognizer is further configured to determine if the detected image of a human form includes a presence of a human facial image and (1) transmit a second signal to the controller responsive to detection of the presence of a human facial image corresponding to the image of a human form, or (2) withhold transmission of the second signal to the controller responsive to the image recognizer failing to detect the presence of a human facial image corresponding to the image of a human form, and further, the image recognizer is configured to transmit a third signal to the controller responsive to the image recognizer subsequently failing to detect the presence of the image of a human form previously detected, and wherein the controller drives the first power unit to displace the cover lid from a closed position overlaying the cushion ring to an open position thereof responsive to receipt of the first signal from the image recognizer, drives the second power unit to displace the cushion seat from a closed position thereof to an open position adjacent the cover lid responsive to receipt of the second signal from the image recognizer, and respectively drives corresponding ones of the first and second power units to respectively displace any of the cover lid and cushion seat from their respective open positions to their corresponding closed positions responsive to receipt of the third signal from the image recognizer.

2. The automatic toilet seat as recited in claim 1, wherein the mage recognizer is mounted on a side of the seat assembly.

3. The automatic toilet seat as recited in claim 1, wherein the mage recognizer is mounted remotely from the seat assembly and wirelessly communicates with the controller.

4. The automatic toilet seat as recited in claim 1, wherein the mage recognizer is mounted remotely from the toilet and wirelessly communicates with the controller.

\* \* \* \* \*